United States Patent
Blakey et al.

(10) Patent No.: US 6,177,015 B1
(45) Date of Patent: Jan. 23, 2001

(54) PROCESS FOR REDUCING THE CONCENTRATION OF DISSOLVED METALS AND METALLOIDS IN AN AQUEOUS SOLUTION

(75) Inventors: Brian Charles Blakey, Oakville; Justin Raskauskas, Mississauga, both of (CA)

(73) Assignee: Inco Limited, Toronto (CA)

( * ) Notice: Under 35 U.S.C. 154(b), the term of this patent shall be extended for 0 days.

(21) Appl. No.: 09/420,152

(22) Filed: Oct. 18, 1999

(51) Int. Cl.$^7$ .................................................. C02F 1/62
(52) U.S. Cl. ..................... 210/713; 210/717; 210/719; 210/724; 210/737; 210/738; 210/911; 210/912; 210/913; 423/508; 423/602
(58) Field of Search .................... 210/717, 719, 210/720, 721, 724, 726, 737, 738, 911, 912, 913, 713; 423/508–510, 602

(56) References Cited

U.S. PATENT DOCUMENTS

| 4,405,464 |   | 9/1983 | Baldwin et al. | 210/717 |
| 4,566,975 | * | 1/1986 | Allgulin | 210/711 |
| 4,724,084 | * | 2/1988 | Pahmeier et al. | 210/709 |
| 4,806,264 |   | 2/1989 | Murphy | 210/695 |
| 5,045,214 | * | 9/1991 | Walker | 210/717 |
| 5,330,658 | * | 7/1994 | Grant et al. | 210/717 |
| 5,820,966 |   | 10/1998 | Krause et al. | 423/87 |

OTHER PUBLICATIONS

Kolthoff, I.M., Elving, P.J., eds., Wiley, *Treatise on Analytical Chemistry Part II: Analytical Chemistry of the Elements*, vol. 7, Wiley, (1961), pp. 155–156.

"Water Management–Policies, Guidelines Provincial Water Quality Objectives of the Ministry of Environment and Energy", Ontario, Canada, Jul. 1994 (Jul. 1995 reprint) Ont. 152.0–155.6.

E. Jackson, *Hydrometallurgical Extraction and Reclamation*, Wiley, Canada, 1986.

A.A. Kudryavtsev, *The Chemistry & Technology of Selenium and Tellurium*, translated by E.M. Elkin, Collects, London, 1974.

* cited by examiner

Primary Examiner—Peter A. Hruskoci
(74) Attorney, Agent, or Firm—Edward A. Steen

(57) ABSTRACT

An aqueous solution, for example, effluent from an off-gas scrubber, is treated to remove metal and metalloid ions by in situ precipitation of ferrous ions by the addition thereto of a ferrous ion-containing solution, salt or other such ferrous ion-containing source and a hydroxyl-yielding base in the presence of the metals and metalloids. The reaction conditions include a temperature of at least about 60° C., and a pH of from about 6 to about 10.

27 Claims, 1 Drawing Sheet

US 6,177,015 B1

PROCESS FOR REDUCING THE CONCENTRATION OF DISSOLVED METALS AND METALLOIDS IN AN AQUEOUS SOLUTION

TECHNICAL FIELD

The present invention relates to treatment of aqueous solutions in general, and, more particularly, to processes for reducing the concentration of dissolved metals and metalloids present in aqueous solutions, e.g., pyrometallurgical plant scrubber solutions.

BACKGROUND ART

Modern base metal smelters capture the bulk of sulfur dioxide gas ($SO_2$) and flue dusts from off-gases produced by smelting. Off-gas cleaning by aqueous scrubbing typically produces acidic solutions rich in $SO_2$ and dissolved metals such as chromium, cobalt, copper, iron, lead, nickel, zinc, etc., and dissolved metalloids such as selenium, tellurium, arsenic, etc. The concentrations of some of the dissolved species in the scrubber solution may be above governmental water management guidelines (see, e.g., "Water Management Policies, Guidelines, Provincial Water Quality Objectives", Ministry of Environment and Energy, Ontario, Canada, July 1994). Removal of these species from scrubber solution is therefore desirable. Removal of many of these species may be accomplished by precipitation via neutralization using, e.g., lime (see, e.g., Jackson, E., Hydrometallurgical Extraction and Reclamation, Wiley, Toronto, 1986). However, neutralization alone is typically not effective for the removal of dissolved selenium, tellurium and arsenic. Smelter scrubber solutions, for example, can contain 1 to 60 milligrams per liter (mg/L) of dissolved selenium or more in the form of selenite (Se(IV)) ions and/or selenate (Se(VI)) ions, 1 to 5 mg/L or more of dissolved tellurium in the form of tellurite (Te(IV)) ions and/or tellurate (Te(VI)) ions, and 50 to 230 mg/L or more of dissolved arsenic in the form of arsenite (As(III)) ions and/or arsenate (As(V)) ions.

Procedures for the removal of dissolved arsenic from scrubber solutions are disclosed in U.S. Pat. No. 5,820,966 to Krause et al. This process involves oxidizing the components of the solution by addition of, e.g., air, followed by neutralization by addition of, e.g., slaked lime in the presence of a sufficient quantity of dissolved ferric (Fe(III)) ion. The Fe(III) ion co-precipitates with dissolved arsenic to produce an environmentally preferred solid iron-arsenic compound, thus reducing the concentration of dissolved arsenic in the solution. A reduction in the concentration of many dissolved metals in solution also occurs. However, this process by itself is not effective for removal of selenium from solutions containing significant concentrations of dissolved selenium, and Se(VI) ions in particular.

A known process for removing selenium ions from solution involves providing $SO_2$ and heat to a solution containing Se(IV) ions to reduce the Se(IV) ions to elemental selenium (see, e.g., Kudryavtsev, A. A., The Chemistry and Technology of Selenium and Tellurium, Collet's, London, 1974). The process requires long residence times and is not effective for the removal of Se(VI) ions from solution.

U.S. Pat. No. 4,405,464 to Baldwin et al. discloses a process for the removal of Se(VI) ions from aqueous solution by contact with metallic iron at a solution pH adjusted to below about 6.0. The examples in the Baldwin et al. patent pertain to the treatment of solutions containing less than about 0.5 mg/L of Se(VI). This process is not effective for reducing high concentrations of Se(VI).

U.S. Pat. No. 4,806,264 to Murphy discloses a method of removing Se(IV) and Se(VI) ions from an aqueous solution. The method includes contacting the solution with an amount of ferrous hydroxide solids at a pH of about 8 to 10 and a preferred temperature of from about 10° C. to 35° C. The examples in the Murphy patent pertain to the treatment of solutions containing less than about 1 mg/L of Se(VI). However, this process is not effective for reducing high concentrations of Se(VI).

The effectiveness of the above prior art processes for the removal of dissolved tellurium from solution is not known.

There is a need for new, efficient methods that are capable of removing dissolved metals and metalloids from aqueous solutions, particularly those methods capable of removing relatively high concentrations (e.g., greater than 1 mg/L) of dissolved metalloids such as selenium, tellurium and arsenic.

SUMMARY OF THE INVENTION

Accordingly, there is provided a process for reducing the concentration of metalloid ions in an aqueous solution which includes introducing an aqueous solution containing an initial concentration of metalloid ions into a reaction zone; reacting ferrous (Fe(II)) ions with hydroxyl ($OH^-$) ions in the reaction zone to precipitate Fe(II) ions in the presence of the metalloid ions to precipitate metalloid ions, resulting in a reduction in the concentration of metalloid ions in the solution. Particularly suitable metalloid ions herein include Se(IV), Se(VI), Te(IV), Te(VI), As(III) and As(V) ions. In one embodiment, the aqueous solution also contains an initial concentration of metal ions, at least a portion of which is reacted with $OH^-$ ions in the reaction zone to precipitate metal ions and cause a reduction in the concentration of metal ions in the aqueous solution.

There is also provided a process for reducing the concentration of metalloid ions in an aqueous feed solution containing an initial concentration of metalloid ions and $SO_2$ which includes introducing the feed solution into a reaction zone, reacting Fe(II) ions with $OH^-$ ions in the reaction zone to precipitate Fe(II) ions in the presence of the metalloid ions to form a slurry containing precipitated metalloid and a solution having a reduced concentration of metalloid ions as compared to the initial concentration of metalloid ions; removing the slurry from the reaction zone; and separating from the slurry at least a portion of the solution having a reduced concentration of metalloid ions. In one embodiment, the process also involves reducing an initial concentration of metal ions in the feed solution wherein metal ions in the feed solution are reacted with $OH^-$ ions in the reaction zone to precipitate metal ions in the slurry and the solution separated from the slurry contains a reduced concentration of metal ions as compared to the initial concentration of metal ions in the feed solution.

The processes described herein can advantageously reduce the concentration of metal ions and metalloid ions such as selenium ions, tellurium ions and arsenic ions to a level typically below 1.0 mg/L, respectively.

PREFERRED MODE FOR CARRYING OUT THE INVENTION

In accordance with the present invention, the concentration of toxic dissolved metals and metalloids is markedly and efficiently reduced in aqueous solutions that may otherwise present environmental and/or health problems. Dissolved metalloids which may be removed from aqueous solution in accordance with the present invention include Se(IV), Se(VI), Te(IV), Te(VI), As(III) and As(V) ions. Dissolved metals which may be removed from aqueous solution in accordance with the present invention include chromium, cobalt, copper, iron, lead, nickel and zinc. It should be understood that the terms "include", "includes" and "including", as used herein mean "including but not limited to." Metal and metalloid ion removal in accordance with the present invention may be conducted in any aqueous environment where such removal is desired. It is contemplated that metals and metalloids may be removed from potable water systems, waste water systems, laboratory water systems and naturally occurring water sources, to name a few.

Figure 1:
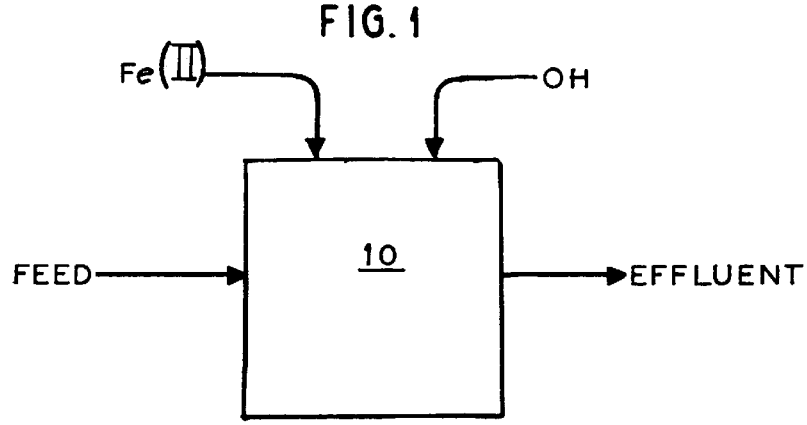
FIG. 1 is a diagrammatic illustration of a process described herein.

Referring now to FIG. 1 a process according to the present invention is illustrated wherein a feed stream containing dissolved metalloids such as selenium ions (as Se(IV) and/or Se(VI)), tellurium ions (as Te(IV) and/or Te(VI)) and/or arsenic ions (as As(III) and/or As(V)), is delivered to a reaction zone 10 wherein Fe(II) ions are reacted with $OH^-$ ions. In this manner, the metalloid ions are converted into precipitating species. For example, selenium ions are converted, at least in part, into solid elemental selenium. Thereafter, a solution containing reduced levels of metalloids may be removed from the reaction zone. In one embodiment, the feed stream also contains dissolved metals which are delivered along with the feed stream to the reaction zone 10 wherein Fe(II) ions and the dissolved metals are reacted with $OH^-$ ions. In this manner, the metal and metalloid ions are converted into respective precipitating species. Thereafter, a solution containing reduced levels of metals and metalloids may be removed from the reaction zone.

The reaction zone 10 can be contained in any vessel such as those associated with any type of continuous or batch reactor, and is preferably a continuous stirred tank reactor (CSTR). The reaction zone contents are preferably maintained at a temperature of at least about 60° C. and more preferably from about 80° C. to about 100° C., and at a pH of from about 6 to about 10 by addition of $OH^-$—yielding base. Ferrous ions can be obtained from any known to those with skill in the art, such as those discussed below, and may be introduced directly into the reaction zone 10 (as shown) or may be introduced into, or may be already present in, the feed stream prior to entering the reaction zone.

In general, for a given quantity of aqueous solution, the greater the concentration of selenium, tellurium and/or arsenic ions in aqueous solution, the greater the amount of Fe(II) is required to reduce the amount of selenium, tellurium and/or arsenic ions. As a corollary, the amount of reduction relates to the amount of Fe(II) added, i.e., the greater the amount of Fe(II), the greater the reduction of dissolved Se(IV), Se(VI), Te(IV), Te(VI), As(III) and As(V) ion in aqueous solution. For example, when reduction of the concentration of dissolved selenium, tellurium or arsenic is desired from an initial concentration on the order of about 100 mg/L to a final concentration below about 1 mg/L the following mass ratios are preferred: the mass of Fe(II) ion should be at least about 4 times the mass of Se(IV) ion (more preferably at least about 6 times, and even more preferably at least about 8 times) in the aqueous solution containing an initial concentration of Se(IV) ions; the mass of Fe(II) ion should be at least about 6 times (more preferably at least about 10 times, and even more preferably at least about 13 times) the mass of Se(VI) ion in the aqueous solution containing an initial concentration of Se(VI) ions. With respect to tellurium ion removal, the mass of Fe(II) ion should be at least about 3 times the mass of Te(IV) ion (more preferably at least about 4 times, and even more preferably at least about 5 times) in the aqueous solution containing an initial concentration of Te(IV) ions; the mass of Fe(II) ion should be at least about 4 times (more preferably at least about 6 times, and even more preferably at least about 8 times) the mass of Te(VI) ion in the aqueous solution containing an initial concentration of Te(VI) ions. With respect to arsenic ion removal, the mass of Fe(II) ion should be at least about 3 times and more preferably at least about 10 times the mass of arsenic ion in the aqueous solution containing an initial concentration of arsenic ions.

Hydroxyl ions can be obtained from any source known to those with skill in the art, such as those sources discussed below. The $OH^-$ ions react with Fe(II) ions to precipitate the Fe(II) ions in the presence of, e.g., selenium ions, which converts the selenium ions (both Se(IV) and Se(VI)), at least in part, to elemental selenium and reduces the concentration of selenium ions to levels below about 1 mg/L in a relatively short period of time. Precipitation of Fe(II) ions in the presence of dissolved metalloids, e.g., selenium ions, is significant since it is associated with production of insoluble metalloid compounds, such as elemental selenium, and iron oxides and/or hydroxides (e.g. $Fe_3O_4$, FeOOH, $Fe(OH)_2$).

Determination of the amount of base necessary to effect precipitation of metals and metalloids in accordance with the present invention is within the purview of those with ordinary skill in the art. In one aspect, using conventional techniques, those skilled in the art can calculate the amount of $OH^-$ necessary to neutralize acidic conditions (e.g., feed stream acid) and provide aqueous solutions having a preferred pH in accordance with the present invention. In addition, those skilled in the art may also use conventional techniques to calculate the amount of $OH^-$ necessary to cause precipitation of metals such as chromium, cobalt, copper, iron, lead, nickel, zinc, etc.

The process of the present invention advantageously removes dissolved metalloids such as selenium, tellurium, arsenic, etc. and dissolved metals such as chromium, cobalt, copper, iron, lead, nickel, zinc, etc., from scrubber solutions such as those used to scrub the off-gases produced during smelting. An object of the present process is to reduce the concentration of dissolved selenium, dissolved tellurium, dissolved arsenic, and other dissolved metals and metalloids in solution each to below 1.0 mg/L.

Figure 2:
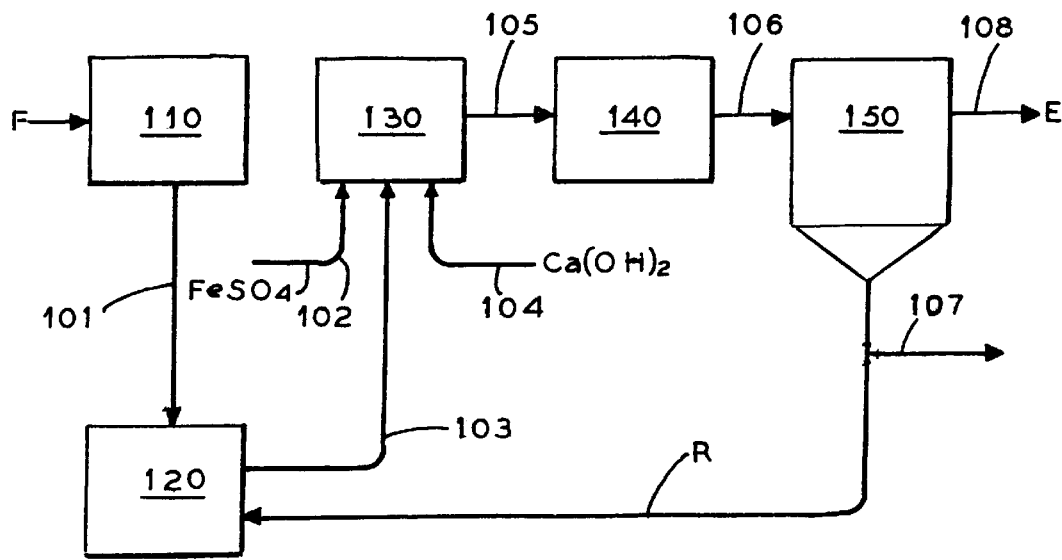
FIG. 2 is a diagrammatic illustration of an industrial installation for operating a process to remove metal ions such as chromium, cobalt, copper, iron, lead, nickel, zinc, etc., and metalloid ions such as selenium, tellurium, arsenic, etc. from a scrubber effluent containing selenium ions, tellurium ions, arsenic ions, $SO_2$ and other dissolved metal and metalloid ions.

Referring now to FIG. 2, a diagrammatic illustration of an example of an industrial installation for operating the present process is shown. In an optional first step, a dissolved selenium ion-containing feed stream F (e.g., an aqueous solution from off-gas scrubbing that may contain $SO_2$ and other dissolved metalloids such as tellurium ions, arsenic ions, and dissolved metal ions such as chromium, cobalt, copper, iron, lead, nickel, zinc, etc.) is first introduced into a preliminary reaction zone contained in vessel 110, which is maintained at a temperature of at least about 60° C., and preferably about 80° C. to about 100° C. Vessel 110 is preferably a CSTR or a number of CSTRs in series.

In the optional first step which may be referred to as an "aging" step, the concentration of dissolved Se(IV) ions (as, e.g., $H_2SeO_3$) is lowered by reaction with $SO_2$, which may be present in the feed solution and/or supplied to vessel 110 by any other means, in accordance with the following reaction:

$$H_2SeO_3 + 2SO_2 + 2H_2O \rightarrow Se° + 2H_2SO_4 + H_2O \quad (I)$$

While Se(IV) is reduced to elemental selenium in this step, the Se(VI) ions are not significantly affected. The selected residence time of the solution in vessel 110 required to achieve the desired reduced level of Se(IV) ion concentration depends on the initial concentration of selenium ion and the temperature of the solution. At higher temperatures less residence time is required to achieve the desired level of concentration. The higher the initial concentration of selenium ion, the more residence time is necessary. Generally, at least 30 minutes is necessary. Those skilled in the art are accustomed to adjusting the residence time in accordance with the above conditions.

In another embodiment of the optional first step, the preliminary reaction zone is contained in a simple conduit through which the solution passes and is heated and/or mixed with other components such as Fe(II) ion sources. Also, elemental selenium-containing solids may be separated from the solution exiting the preliminary reaction zone (e.g., vessel 110) by, e.g., filtration, clarification, etc., in order to recover elemental selenium.

Solution leaving the optional first step may be sent directly to vessel 130 (discussed below) but is preferably sent via line 101 to vessel 120 which is also preferably a CSTR. Vessel 120 also receives a recycle stream R from thickener vessel 150 (described below) which is portioned off from the underflow of thickener 150. An objective of this stage of the process is to reduce the rate of scale formation in vessel 130 when pH is adjusted using a calcium-containing base by providing calcium sulfate seed, thereby increasing the surface area available for crystal growth. This aspect is exemplified in U.S. Pat. No. 5,820,966, incorporated herein by reference.

Slurry exiting from vessel 120 is sent via line 103 to vessel 130 which is also preferably a CSTR (or a series of CSTRs). Ferrous ions are provided to the contents of vessel 130 by any conventional technique known to those skilled in the art such as by adding a ferrous salt or a solution thereof to vessel 130 and/or by mixing a Fe(II) ion-containing salt or solution with the feed stream. Alternatively a sufficient quantity of Fe(II) ions may already be present in the feed solution. In a preferred embodiment Fe(II) ions are added to the contents of vessel 130 in the form of a ferrous salt solution. Preferred ferrous salts include ferrous sulfate ($FeSO_4 \cdot xH_2O$), ferrous chloride ($FeCl_2 \cdot xH_2O$), ferrous carbonate ($FeCO_3$) and ferrous ammonium sulfate ($Fe(NH_4)_2(SO_4)_2 \cdot xH_2O$). It should be understood that any suitable ferrous salt may be used. Other examples of ferrous salts include ferrous iodide ($FeI_2 \cdot xH_2O$), ferrous fluoride ($FeF_2 \cdot xH_2O$), ferrous bromide ($FeBr_2$), ferrous perchlorate ($Fe(ClO_4)_2 \cdot H_2O$) and ferrous acetate ($Fe(C_2H_3O_2)_2 \cdot 4H_2O$). It should also be understood that Fe(II) ions for use herein may be obtained from any source known to those skilled in the art. For example, scrap iron may be contacted with acid solution to obtain Fe(II).

In another preferred embodiment, an aqueous process stream containing Fe(II) ion (e.g., scrubber solution from an ore concentrate smelter) can be used in conjunction with, or instead of, the more expensive ferrous salt solution. The Fe(II) ion-containing stream may be added to vessel 110 or 130. Because the Fe(II) ions are provided to the solution, less ferrous salt needs to be added to vessel 130.

Simultaneously with or subsequent to the addition of Fe(II) ion source, a source of base yielding $OH^-$ ions in the aqueous solution is added to vessel 130 to effect the precipitation of Fe(II) ion. In a continuous process, the base is preferably added simultaneously with the addition of a source of Fe(II) ions. It should be understood that any suitable source of base known to those skilled in the art that is capable of precipitating ferrous ions is suitable for use herein. The source of such base is preferably an alkaline earth metal hydroxide such as slaked lime ($Ca(OH)_2$), or an alkali metal hydroxide such as sodium hydroxide (NaOH), but may also be any suitable source of base such as sodium carbonate ($Na_2CO_3 \cdot xH_2O$), potassium carbonate ($K_2CO_3 \cdot xH_2O$), calcined dolomite (i.e., a mixture of calcium and magnesium oxides), etc. A weaker base such as calcium carbonate ($CaCO_3$) is not suitable by itself, although such a base could be added to cause neutralization to elevate solution pH to about pH 5. Subsequently, a stronger base could be added to achieve a solution pH required for the invention.

The base provides a source of $OH^-$ ions which react with the Fe(II) ions to precipitate the Fe(II) ions in the presence of the selenium ions. Sufficient base is added to adjust the pH from about 6 to about 10, preferably from about 8 to about 9. The vessel 130 is maintained at a temperature of at least about 60° C., preferably from about 80° C. to about 100° C. Heating of the feed solution can also be performed at any point in the process prior to vessel 130. The residence time of the solution in vessel 130 is preferably at least about 5 minutes, and more preferably from about 30 minutes to about 1 hour.

In one embodiment of the present invention, which typically involves a commercial process, $OH^-$ ions may be provided by use of a low-cost calcium-containing base. The use of such base may result in the formation of solid calcium sulfate scale on equipment surfaces exposed to solution. Accordingly, as discussed above, there is also provided a process to minimize the formation of calcium sulfate scale. This is accomplished by providing calcium sulfate seed. See U.S. Pat. No. 5,820,966.

Slurry exiting from vessel 130 is sent via line 105 to vessel 140, which is also preferably a CSTR (or a series of CSTRs), which serves to provide additional residence time for the reactions to occur and to prevent "short-circuiting" of the slurry through the reaction zone, and is maintained at preferably the same temperature as vessel 130. The residence time of the solution in vessel 140 is preferably at least about 5 minutes, and more preferably from about 30 minutes to about 1 hour. Vessel 140 could be equipped the same as 130 so that vessel 130 could be by-passed for maintenance while ensuring that processing of the scrubber solution is uninterrupted.

Slurry exiting from vessel 140 is optionally sent via line 106 to a settling stage in thickener 150. Thickener 150 is unheated and the temperature is allowed to drop. Typically, under operating conditions the contents of thickener 150 will be at a temperature of about 60° C. The overflow from thickener 150, released via line 108, may be of sufficient purity to be released to the environment after removal of entrained solids. Alternatively, the solution may be recycled as process water. The underflow, a thick mud-like slurry, can be divided such that a portion of the underflow is sent via line 107 to tailings while another portion of the thickener underflow can be recycled back to vessel 120 for the aforementioned purpose of decreasing the scale formation in vessel 130. Generally, the recycle stream R can be from about 20% to about 90% of the total underflow of thickener 150. The preferred recycle percentage is at least about 50% of the thickener 150 underflow.

It should be understood that various configurations of process equipment could be utilized in accordance with the present invention. For example vessels 130 and 140 may alternatively be a pipe single reactor. Thus, fewer or greater numbers of components as compared to those illustrated in FIG. 2 may be utilized in accordance with the present invention.

Certain features of the invention herein are illustrated in Examples 1 to 10. The Examples herein are included for purposes of exemplification and are not to be construed as limiting the scope of the present invention. The following Comparative Examples A and B are not in accordance with the process of the present invention.

EXAMPLE 1

In this Example, a 1.5 liter stirred tank was used as the reactor. The feed solution contained 200 mg/L selenium as Se(VI) ions along with 0.2 normal (N) $H_2SO_4$. One liter of feed was added to the reactor and heated to a temperature of 80° C. The reactor contents were agitated at all times. Sufficient concentrated ferrous sulfate solution was added to provide 2.5 grams of Fe(II) per liter of feed, and then sufficient concentrated NaOH solution was added to raise the pH of the reactor contents to pH 8. The contents were maintained at a temperature of 80° C. and a pH not less than 8 for 60 minutes following the neutralization, with samples periodically taken after the neutralization. The results are shown in Table 1.

EXAMPLE 2

This example was conducted in a manner similar to that of Example 1 except that the concentrated ferrous sulfate solution was added to provide 5.0 grams of Fe(II) per liter of feed. The results are shown in Table 1.

EXAMPLE 3

This Example was performed in a manner similar to Example 1 except that the feed contained Se(IV) ions rather than Se(VI) ions. The results are shown in Table 1.

EXAMPLE 4

This Example was performed in a manner similar to Example 1 except that ferrous chloride was used instead of ferrous sulfate. The results are shown in Table 1.

EXAMPLE 5

This Example was performed in a manner similar to Example 4 except that the feed contained 0.2 N HCl rather than $H_2SO_4$. The results are shown in Table 1.

Comparative Example A

This Comparative Example was conducted in a manner similar to Example 1 except that the feed solution was heated to 50° C. rather than 80° C. and the reactor contents were maintained at a temperature of 50° C. rather than 80° C. The results are shown in Table 1.

Comparative Example B

In this Comparative Example, a 1.5 liter stirred tank was used as the reactor. The feed solution contained 2.5 grams of dissolved Fe(II) ion per liter (as ferrous sulfate) along with 0.2 N $H_2SO_4$. One liter of feed was added to the reactor and heated to a temperature of 80° C. The reactor contents were agitated at all times. Sufficient concentrated NaOH solution was added to raise the pH of the reactor contents to pH 8 to precipitate the dissolved Fe(II) ion as ferrous hydroxide. Then a solution of concentrated sodium selenate was added to the reactor contents such that the initial concentration of Se(VI) was 200 mg/L. The contents were maintained at a temperature of 80° C. and a pH of not less than 8 for 60 minutes following the addition of sodium selenate solution, with samples periodically taken after the addition of sodium selenate solution addition.

The results are shown in Table 1.

TABLE 1

(Dissolved selenium concentration in mg/L after solution neutralization to pH 8 (Time = 0 minutes)* and after indicated elapsed time.)

| | | Time/min | | | | | |
|---|---|---|---|---|---|---|---|
| Example | Feed | 0 | 5 | 10 | 20 | 40 | 60 |
| 1 | 200 | 10 | 0.2 | <0.1 | 0.5 | 0.3 | 0.2 |
| 2 | 200 | 0.3 | <0.1 | <0.1 | <0.1 | <0.1 | <0.1 |
| 3 | 200 | <0.1 | <0.1 | — | 0.3 | 0.1 | 0.4 |
| 4 | 200 | 50 | 0.7 | <0.1 | <0.1 | 0.5 | 0.5 |
| 5 | 200 | 15 | 0.4 | 0.2 | <0.1 | 0.2 | — |
| Comp. Ex. A | 200 | 75 | 75 | 75 | 70 | 60 | 60 |
| Comp. Ex. B | 200 | 160 | 105 | 65 | 50 | 50 | 50 |

*Neutralization to pH 8 required about 6 minutes.

EXAMPLE 6

This Example was performed in a manner similar to Example 1 except that the feed contained Te(VI) ions rather than Se(VI) ions, and that the concentrated ferrous sulfate solution was added to provide 2.5 grams of Fe(II) per liter of feed. The results are shown in Table 2.

EXAMPLE 7

This Example was performed in a manner similar to Example 1 except that the feed contained Te(IV) ions rather than Se(VI) ions, and that the concentrated ferrous sulfate solution was added to provide 1.7 grams of Fe(II) per liter of feed. The results are shown in Table 2.

TABLE 2

(Dissolved tellurium concentration in mg/L after solution neutralization to pH 8 (Time = 0 minutes)* and after indicated elapsed time.)

| | | Time/min | | | | | |
|---|---|---|---|---|---|---|---|
| Example | Feed | 0 | 5 | 10 | 20 | 40 | 60 |
| 6 | 200 | 0.2 | 0.5 | 0.4 | 0.3 | 0.4 | — |
| 7 | 200 | <0.01 | 0.03 | 0.2 | — | — | — |

*Neutralization to pH 8 required about 6 minutes.

As the above Examples 1 to 5 show, the process herein is effective for the removal of dissolved selenium ions in aqueous solutions initially containing at least 200 mg/L to less than 1 mg/L within a few minutes. Example 2 shows a reduction of selenium ion concentration from 200 mg/L to less than 0.1 mg/L is possible within a few minutes when the quantity of Fe(II) precipitated in solution is increased. Examples 1 to 5 show the process herein is effective for the removal of both Se(IV) ions and Se(VI) ions. Examples 1 to 5 also show the process herein is effective in a sulfate solution, a chloride solution, as well as mixed sulfate-chloride solution.

By contrast, Comparative Example A shows that a reaction temperature of 50° C. is too low to achieve a suitable reduction in the selenium ion concentration. As can be seen, even after 60 minutes the selenium ion concentration remains at 60 mg/L. Comparative Example B shows that when dissolved ferrous salt and hydroxyl-yielding base are first reacted to form ferrous hydroxide precipitate, and then the ferrous hydroxide precipitate is contacted with dissolved selenium ion in solution, suitable results were not achieved. The selenium ion concentration remains relatively high (i.e., 50 mg/L) even after 60 minutes.

Accordingly, the reaction temperature and the precipitation of the Fe(II) ion while in the presence of the dissolved selenium ion, are significant features herein.

Examples 6 and 7 demonstrate the process herein is effective for the removal of dissolved tellurium ions (both Te(IV) and Te(VI)) in aqueous solutions initially containing at least 200 mg/L to less than 1 mg/L within a few minutes.

The following Examples 8 to 10 pertain to the treatment of a feed stream that was an aqueous solution from an off-gas scrubber in accordance with the present invention. The feed stream contained dissolved components at concentrations that varied according to the range of values of Table 3 below.

TABLE 3

(Concentration range for feed stream. Concentrations in mg/L)

| Component | Low | High |
|---|---|---|
| Cu | 0.15 | 1.6 |
| Ni | 18 | 84 |
| Co | 0.29 | 1.3 |
| Fe | 0.91 | 13 |
| As | 72 | 230 |
| Pb | 0.77 | 13 |
| Cr | 0.22 | 3.5 |
| Se | 8.9 | 58 |
| $SO_2$ | <100 | 670 |
| $H_2SO_4$ | <500 | 14700 |

EXAMPLE 8

Aqueous slaked lime slurry containing 24 percent by weight solids and ferrous sulfate solution containing 19.4 grams of Fe(II) per liter were used as reagents in this Example. Referring again to FIG. 2, in this Example feed stream F was sent directly to vessel 130, the slurry exiting vessel 130 was sent to vessel 140, and the slurry exiting vessel 140 was discharged from the process. Vessel 120 was not employed, nor was a recycle stream R used.

The vessels 130 and 140 were maintained at 80° C., each having a residence time of 30 minutes. Vessels 130 and 140 were each baffled CSTR's having a 16 liter capacity and were each agitated by a 6 bladed impeller operating at 500 rpm. The rate of feed F was 435 milliliters per minute. The ferrous solution was added at a rate of 65 milliliters per minute. The slaked lime slurry was added at a rate sufficient to maintain the pH at 8.0. The average assays of dissolved selenium exiting each vessel were as indicated in Table 4 below. The average assays of dissolved arsenic exiting each vessel were as indicated in Table 5 below. Furthermore, the average concentrations of the following dissolved species in the solution exiting vessel 140 were each <0.1 mg/L: copper, cobalt, lead, chromium. The average concentrations of dissolved nickel and dissolved iron in the solution exiting vessel 140 were about 0.1 mg/L and 1 mg/L, respectively. Finally, the average rate of scale growth measured in vessel 130 was 7 millimeters per day.

EXAMPLE 9

This Example was conducted in a manner similar to Example 8 except that the rate of feed F was 375 milliliters per minute instead of 435 milliliters per minute. The ferrous solution was added at a rate of 125 milliliters per minute instead of 65 milliliters per minute. The average assays of dissolved selenium exiting each vessel were as indicated in Table 4 below. The average assays of dissolved arsenic exiting each vessel were as indicated in Table 5 below. Furthermore, the average concentrations of the following dissolved species in the solution exiting vessel 140 were each <0.1 mg/L: copper, cobalt, lead, chromium. The average concentrations of dissolved nickel and dissolved iron in the solution exiting vessel 140 were about 0.1 mg/L and 1 mg/L, respectively. Finally, the average rate of scale growth measured in vessel 130 was 7 millimeters per day.

EXAMPLE 10

This Example was conducted in a manner similar to Example 8 except that the feed stream F was sent to vessel 120. Vessel 120 received a recycle stream R which consisted of 50% of the thickened underflow slurry from thickener 150. Vessel 120 was a CSTR with 8 liters of capacity and was maintained at a temperature similar to that of CSTR 110 and the other CSTR vessels. The residence time of CSTR vessel 120 was 15 min. In this Example the operating temperature of CSTR vessels 110, 120, 130 and 140 was maintained at 80° C. The feed rate was 435 mL/min and the ferrous solution was added at the rate of 65 mL/min. The average assays of dissolved selenium exiting each vessel were as indicated in Table 4 below. The average assays of dissolved arsenic exiting each vessel were as indicated in Table 5 below. Furthermore, the average concentrations of the following dissolved species in the solution exiting vessel 150 were each <0.1 mg/L: copper, cobalt, lead, chromium. The average concentrations of dissolved nickel and dissolved iron in the solution exiting vessel 150 were about 0.1 mg/L and 1 mg/L, respectively. Finally, the average rate of scale growth measured in vessel 130 was 1 millimeters per day.

TABLE 4

(Average Dissolved Selenium Concentrations in mg/L)

| Example | F | 120 | 130 | 140 | 150 |
|---|---|---|---|---|---|
| 8 | 30 | N/A | <1 | <1 | N/A |
| 9 | 36 | N/A | <1 | <1 | N/A |
| 10 | 44 | 47 | <1 | <1 | <1 |

TABLE 5

(Average Dissolved Arsenic Concentrations in mg/L)

| Example | F | 120 | 130 | 140 | 150 |
|---|---|---|---|---|---|
| 8 | 166 | N/A | 1.1 | 0.9 | N/A |
| 9 | 198 | N/A | 0.5 | 0.6 | N/A |
| 10 | 122 | 161 | 0.8 | 0.2 | 017 |

As the above Examples 8 to 10 show, the process herein is effective in reducing the concentration of dissolved selenium ion in aqueous scrubber solutions to less than 1.0 mg/L. Example 10 shows the process is likewise effective when recycling a portion of thickened slurry to vessel 120 is employed.

Examples 8 to 10 further show the process herein is effective in reducing the concentration of dissolved arsenic ion in aqueous scrubber solutions to less than 1.0 mg/L. Examples 8 and 9 show that when dissolved Fe(II) ion addition is increased lower dissolved arsenic concentrations in solution are possible.

Furthermore, Examples 8 to 10 show the concentrations of other dissolved metal and metalloid species in scrubber solutions (see Table 2) may be reduced to less than about 1.0 mg/L or even less than about 0.1 mg/L.

Finally, Examples 8 to 10 show that recycling 50% of the thickened slurry from vessel 140 in accordance with the present invention reduces the rate of scale growth in vessel 120 by a factor of 7. It is anticipated that increasing the portion of underflow recycled from vessel 140 will decrease the scale growth rate further.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of other features.

The embodiments of the invention in which an exclusive property or privilege is claimed are defined as follows:

1. A process for reducing the concentration of metalloid ions in an aqueous solution, the process consisting essentially of:
    a) introducing the aqueous solution containing an initial concentration exceeding 1 milligram per liter of metalloid ions selected from the group consisting of selenium ions, tellurium ions, arsenic ions and combinations thereof into a reaction zone;
    b) reacting Fe(II) ions with $OH^-$ ions in the reaction zone to precipitate Fe(II) ions in the presence of the metalloid ions to precipitate metalloid ions resulting in a reduction in the concentration of metalloid ions in the solution wherein the pH of the aqueous solution in the reaction zone is at least about 6, and the temperature of the aqueous solution is at least about 60° C.

2. The process for reducing the concentration of metalloid ions in an aqueous solution according to claim 1 further comprising reducing an initial concentration of metal ions contained in the aqueous solution wherein the aqueous solution of step (a) contains the initial concentration of metal ions, at least a portion of which is reacted with $OH^-$ ions to precipitate metal ions and cause a reduction in the concentration of metal ions in the aqueous solution.

3. The process for reducing the concentration of metalloid ions in an aqueous solution according to claim 2 wherein the metal ions are selected from the group consisting of chromium ions, cobalt ions, copper ions, lead ions, nickel ions, zinc ions and combinations thereof.

4. The process for reducing the concentration of metalloid ions in an aqueous solution according to claim 3 wherein the selenium ions are selected from the group consisting of Se(IV) ions and Se(VI) ions, the tellurium ions are selected from the group consisting of Te(IV) ions and Te(VI) ions, and the arsenic ions are selected from the group consisting of As(III) ions and As(V) ions.

5. The process for reducing the concentration of metalloid ions in an aqueous solution according to claim 4 wherein the mass of Fe(II) ion provided to the aqueous solution in the reacting step is at least about 4 times the mass of Se(IV) ion in the aqueous solution containing an initial concentration of metalloid ions.

6. The process for reducing the concentration of metalloid ions in an aqueous solution according to claim 4 wherein the mass of Fe(II) ion provided to the aqueous solution in the reacting step is at least about 6 times the mass of Se(VI) ion in the aqueous solution containing an initial concentration of metalloid ions.

7. The process for reducing the concentration of metalloid ions in an aqueous solution according to claim 1 wherein the reaction zone is contained within a continuous stirred tank reactor and the aqueous solution therein is agitated while Fe(II) ions and $OH^-$ ions are being introduced.

8. The process for reducing the concentration of metalloid ions in an aqueous solution according to claim 1 wherein the aqueous solution of step (a) contains Fe(II) ions.

9. The process for reducing the concentration of metalloid ions in an aqueous solution according to claim 1 wherein the reaction zone is contained within a continuous pipe reactor and the aqueous solution therein is transported while Fe(II) ions and $OH^-$ ions are being introduced.

10. The process for reducing the concentration of metalloid ions in an aqueous solution according to claim 1 wherein the pH of the aqueous solution in the reacting step ranges from about 6 to about 10.

11. The process for reducing the concentration of metalloid ions in an aqueous solution according to claim 1 wherein the pH of the aqueous solution in the reacting step ranges from about 8 to about 9.

12. The process for reducing the concentration of metalloid ions in an aqueous solution according to claim 1 wherein the source of Fe(II) ions is selected from the group consisting of ferrous sulfate, ferrous chloride, ferrous carbonate, ferrous ammonium sulfate and combinations thereof.

13. The process for reducing the concentration of metalloid ions in an aqueous solution according to claim 1 wherein the source of $OH^-$ ions is selected from the group consisting of slaked lime, sodium hydroxide, calcined dolomite, sodium carbonate, potassium carbonate and combinations thereof.

14. The process for reducing the concentration of metalloid ions in an aqueous solution according to claim 13 wherein the source of $OH^-$ ions is supplemented by calcium carbonate and/or ferrous carbonate.

15. The process for reducing the concentration of metalloid ions in an aqueous solution according to claim 1 wherein the temperature of the aqueous solution in the reacting step ranges from about 80° C. to about 100° C.

16. The process for reducing the concentration of metalloid ions in an aqueous solution according to claim 1 wherein the concentration of each species of metalloid ions is reduced to below about 1 mg/L, respectively.

17. A process for reducing the concentration of metalloid ions in an aqueous feed solution containing an initial concentration exceeding 1 milligram per liter of metalloid ions and $SO_2$, wherein said metalloid ions are selected from the group consisting of selenium ions, tellurium ions, arsenic ions, and combinations thereof, the process consisting essentially of:
    (a) introducing the feed solution to a reaction zone;
    (b) reacting Fe(II) ions with $OH^-$ ions in the reaction zone to precipitate Fe(II) ions in the presence of the metalloid ions to form a slurry containing precipitated metalloid and a solution having a reduced concentration of metalloid ions as compared to the initial concentration of metalloid ions in the feed solution wherein the pH of the aqueous solution in the reaction zone is at least about 6, and the temperature of the aqueous solution is at least about 60° C.; and (c) removing the slurry from the reaction zone and separating from the slurry at least a portion of the solution having a reduced concentration of metalloid ions.

18. The process for reducing the concentration of metalloid ions in an aqueous feed solution containing an initial concentration of metalloid ions and $SO_2$ according to claim 17 further comprising reducing an initial concentration of metal ions in the feed solution wherein metal ions in the feed solution are reacted with $OH^-$ ions in the reaction zone to precipitate metal ions in the slurry of step (b) and the solution separated from the slurry in step (c) contains a reduced concentration of metal ions as compared to the initial concentration of metal ions in the feed solution.

19. The process for reducing the concentration of metalloid ions in an aqueous feed solution containing an initial concentration of metalloid ions and $SO_2$ according to claim 18 wherein the metal ions are selected from the group consisting of chromium ions, cobalt ions, copper ions, lead ions, nickel ions, zinc ions and combinations thereof.

20. The process for reducing the concentration of metalloid ions in an aqueous solution containing an initial concentration of metalloid ions and $SO_2$ according to claim 18 wherein separating from the slurry at least a portion of the solution containing a reduced concentration of metalloid ions in step (c) provides a residual slurry containing metal and metalloid precipitates, the process further comprising recycling a portion of the residual slurry to the feed solution prior to introducing the feed solution to the reaction zone of step (a).

21. The process for reducing the concentration of metalloid ions in an aqueous solution containing an initial concentration of metalloid ions and $SO_2$ according to claim 17 wherein the step (b) of reacting the Fe(II) ions with the $OH^-$ ions includes introducing into said reaction zone of step (a) a ferrous salt solution.

22. The process for reducing the concentration of metalloid ions in an aqueous solution containing an initial concentration of metalloid ions and $SO_2$ according to claim 17 wherein the feed solution contains selenite ions, the process further comprising introducing the feed solution into a preliminary reaction zone prior to step (a) and maintaining the solution in the preliminary reaction zone at a temperature sufficient to react selenite ions with sulfur dioxide and form elemental selenium.

23. The process for reducing the concentration of metalloid ions in an aqueous solution containing an initial concentration of metalloid ions and $SO_2$ according to claim 22 wherein a source of sulfur dioxide is added to the preliminary reaction zone.

24. The process for reducing the concentration of metalloid ions in an aqueous solution containing an initial concentration of metalloid ions and $SO_2$ according to claim 22 wherein a source of Fe(II) ions is introduced to the preliminary reaction zone.

25. The process for reducing the concentration of metalloid ions in an aqueous solution containing an initial concentration of metalloid ions and $SO_2$ according to claim 17 wherein the pH of the reaction zone of step (a) ranges from about 6 to about 10.0.

26. The process for reducing the concentration of metalloid ions in an aqueous solution containing an initial concentration of metalloid ions and $SO_2$ according to claim 17 wherein the pH of the reaction zone of step (a) ranges of from about 8 to about 9 and the temperature of the reaction zone ranges from about 80° C. to about 100° C.

27. The process for reducing the concentration of metalloid ions in an aqueous solution containing an initial concentration of metalloid ions and $SO_2$ according to claim 17 wherein the concentration of each metalloid ion in the feed stream exceeds about 1 mg per liter and the reduced concentration of each metalloid ion in the solution containing a reduced concentration of metalloid ions is less than about 1 milligram per liter.

* * * * *